United States Patent [19]

Oberdörfer

[11] Patent Number: 4,651,774

[45] Date of Patent: Mar. 24, 1987

[54] SINGLE-LEVER MIXER

[75] Inventor: Hans E. Oberdörfer, Stuttgart, Fed. Rep. of Germany

[73] Assignee: Hansa Metallwerke AG, Stuttgart, Fed. Rep. of Germany

[21] Appl. No.: 753,427

[22] Filed: Jul. 10, 1985

[30] Foreign Application Priority Data

Jul. 20, 1984 [DE] Fed. Rep. of Germany ....... 3426741

[51] Int. Cl.$^4$ ............................................. F16K 19/00
[52] U.S. Cl. ................................................. 137/625.17
[58] Field of Search ............ 137/625.17, 625.4, 625.41

[56] References Cited

U.S. PATENT DOCUMENTS 3,384,119 5/1968 Manoogian ..................... 137/625.17
4,513,781 4/1985 Nikolayczik ................ 137/625.17 X Primary Examiner—Robert G. Nilson
Attorney, Agent, or Firm—Fred Philpitt

[57] ABSTRACT

On a single-lever mixer, the operating lever (26), which is rigidly connected to a cartridge adjusting shank (16), has a lever section (30) which is concentric with the adjusting shank swivel axis (18), is circular-arc-shaped and has been passed through an opening (32) in the circumferential wall (34) of the cover (36) shutting the cartridge reception opening (12) of the housing (10). The cover (36) is connected, so as to be secured against rotation, to an adjusting shank bearing part (20) which is rotatable about the cartridge axis.

16 Claims, 3 Drawing Figures

SINGLE-LEVER MIXER

The invention relates to a single-lever mixer as described in the introductory part of claim 1.

On known single-lever mixers of this kind, the operating lever has been placed on the adjusting shank of the control cartridge and has been tightened thereon. Integrally formed with the operating lever is the cup-shaped cover which shuts off the open end of the mixer housing recess receiving the control cartridge. This causes the cover to be rotated about the axis of the control cartridge together with the operating lever and to be swivelled about the swivel axis of the adjusting shank when different mixture ratios and the desired quantity of water are set. During this process, the size of the gap between the cover and the mixer housing is changed. Furthermore, the mixer head formed by the end of the mixer housing and the cover does not have the same appearance in different working positions.

It is the object of the present invention to develop a single-lever mixer according to the introductory part of claim 1 to the effect that the mixer head formed by the cover and the end of the mixer housing has in all working positions of the mixer constant small gaps between the parts which are moved relative to one another.

According to the invention, this problem is solved by a single-lever mixer as described in claim 1.

In the case of the single-lever mixer according to the invention, the cover does not participate in the swivel movement of the operating lever but is rotated together with the operating lever about the axis of the control cartridge. Since the cup-shaped cover as a rule has a rotationally symmetrical configuration, the mixer head formed by the housing end and the cover thus presents a picture which is substantially constant in all working positions. The water temperature and water quantity chosen can be easily read from the position of the operating lever.

Since, on the single-lever mixer according to the invention, the gaps between parts moved relative to one another (circular-arc-shaped lever section and associated passage port in the cover; opposite free edges of the cover and the mixer housing) are always at constant intervals from one another, these intervals may be chosen to be very small. One thus obtains very good sealing of the mixer interior to prevent the intrusion of splashed water and contaminants.

Advantageous developments of the invention are given in the Sub-Claims.

The development of the invention according to claim 3 ensures a good torque-transmitting connection between the cover and the bearing part, which also prevents the risk of the cover being tilted. Nevertheless, the cover can be very easily fitted by being axially placed on the bearing part of the control cartridge.

The development of the invention according to claims 4 to 6 is of advantage with respect to a simple assembly of the operating lever and the cover without any special tools.

With the development of the invention according to claim 7 there is obtained a particularly good seal at the point where the operating lever passes through the cover, the as a rule highly polished and chromium-plated surface of the operating lever being protected against scratches by the relatively soft material of the sliding seal.

Hereinafter, the invention will be explained in more detail with reference to the accompanying drawing, in which.

Figure 1:
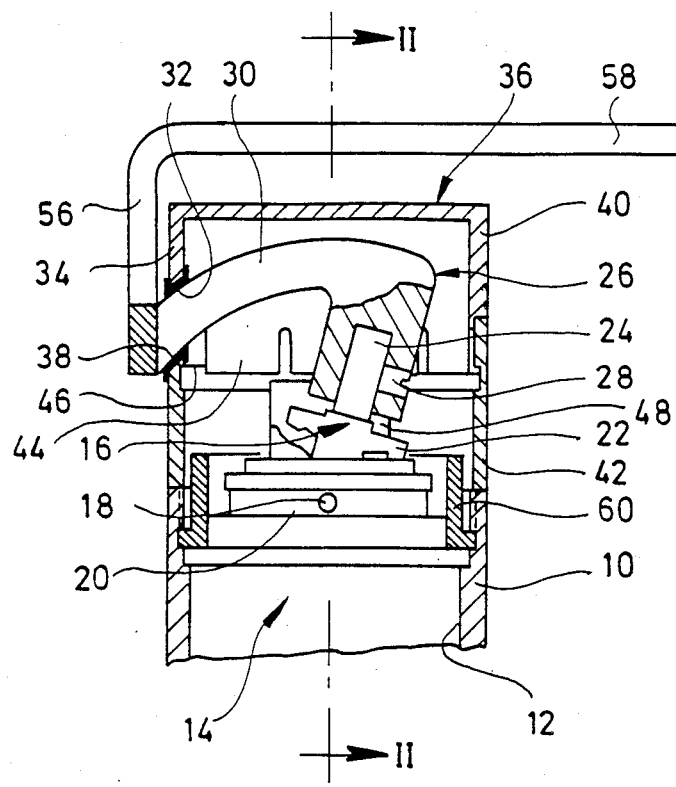
FIG. 1 shows a vertical section through the head of a single-lever mixer.
Figure 2:
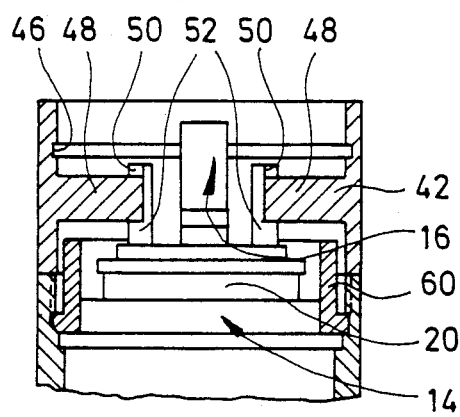
FIG. 2 shows a section through the mixer head of FIG. 1 along the line of intersection II—II therein, with the operating lever and the upper cover part removed.
Figure 3:
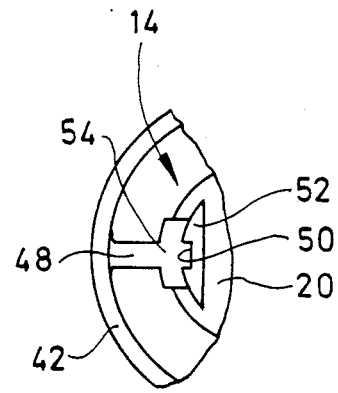
FIG. 3 shows a top view of a key/slot connection, via which the lower cover part is connected to a bearing part of the control cartridge of the mixer so as to be secured against rotation.

FIG. 1 shows the free end of the housing 10 of a single-lever mixer, which end is the upper one on a washstand fitting. In the housing 10 there is provided a recess 12, in which a control cartridge, which is designated 14 as a whole, is received. In the bottom of the control cartridge 14 and that of the recess 12 there are provided aligned connection ports for cold and hot water as well as mixed water. In the interior of the control cartridge there is a stationary control disc and a movable control disc, which are provided with control ports so as to set the temperature and the quantity of the mixed water according to the angular position of the movable control element in relation to the cartridge axis and according to the radial deflection of the movable control element from the cartridge axis.

On the movable control element, which is not shown in detail, there acts an adjusting shank 16 which is mounted by means of a pin 18 in a bearing part 20, which, for its part, is rotatable about the cartridge axis.

The adjusting shank 16 has stop arms 22 which, together with the face of the bearing part 20, limit the swivel angle of the adjusting shank 16. An operating lever, which is designated 26 as a whole, has been placed on a square section 24 of the adjusting shank 16 and has been secured thereto by means of a grub screw 28.

The operating lever 26 has a circular-arc-shaped lever section 30, the centre of the circular arc coinciding with the axis of the pin 18. The lever section 30 has been passed through an opening 32 in a circumferential wall 34 of a cover which is designated 36 as a whole, there being additionally provided a sliding seal 38 for improved sealing and for the protection of the highly polished chromium-plated surface.

The cover 36 consists of a lower sleeve-shaped cover part 42 as well as a cup-shaped upper cover part 40 which has integrally formed axial spring fingers 44 which, with their free ends, engage in a detent groove 46 in the lower cover part 42.

The lower cover part 42 has two diametrically opposite, radially inwardly extending webs 48 which engage in slots 50 of two driving lugs 52 which project axially from the face of the bearing part 20 and are integrally formed with the latter. The axial dimension of the slots 50 and the position and the length of the webs 48 are so co-ordinated that the free edge of the cover 36 which is at the bottom in the drawing lies with a slight clearance above the free edge of the housing 10.

For a more reliable support, the webs 48 are provided with arms 54 which extend in the circumferential direction and whose radially inward cylindrical surface fits in a form-locking manner on the cylindrical outer surface of the driving lugs 52.

Outside the cover 36, the operating lever 26 has a lever section 56 which, in the closed position of the mixer, extends axially upwardly and which is followed by a transversal actuating section 58 passing above the cover 36.

The above-described single-lever mixer can be assembled as follows:

The control cartridge 14 is inserted into the recess 12 of the housing 10 and is screwed down by means of a threaded ring 60. Now the lower cover part 42 is placed on the bearing part 20 so that the webs 48 are fully inserted into the slots 50. Thereafter, the operating lever 26 is placed on the square section 24 of the adjusting shank 16 and the grub screw 28 is tightened. Now the slotted sliding seal 38 is fitted around the circular-arc-shaped lever section 30 and is positioned on the circumferential wall of the lower cover part 42. Lastly, the upper cover part 40 is clipped on the lower cover part 42, attention only having to be paid to the correct position of the sliding seal 36 relative to the circumferential wall of the upper cover part 40.

For setting the water quantity, the operating lever 26 is swivelled in the anti-clockwise sense in FIG. 1. During this movement, the cover 36 is stationary. When the operating lever 26 is rotated about the axis of the control cartridge 14 for setting the temperature, the cover 36 follows this rotational movement, driving being effected via the slots 50 and the webs 48, so that the sliding seal 38 does not have to carry out any driving function.

One discerns that in the case of the above-described single-lever mixer the mixer interior is very well protected against splash water and contaminants, that the mixer head also has a constant pleasing appearance in all working positions, and that these advantages are obtained with a very simple mechanical construction of the mixer head.

I claim:

1. A single-lever mixer provided with a housing, a control cartridge, which is arranged in a recess of the latter and which, for setting the mixing ratio and the throughput, comprises a control element, which is rotatable relative to the cartridge axis and is radially displaceable, as well as an adjusting shank, which moves this element and which is mounted in a bearing part, which is rotatable about the cartridge axis, so that it can be swivelled about an axis that is vertical to the cartridge axis, an operating lever connected to the adjusting shank and with a cup-shaped cover which substantially shuts the cartridge recess of the housing, characterised in that the cover (36) is mounted so as to be rotatable about the cartridge axis and its free edge is opposite to the free edge of the housing (10) at a short distance, and in that the operating lever (26) has a circular-arc-shaped lever section (30), which is concentric with the swivel axis (18) of the adjusting shank (16) and which has been passed through an opening (32) in the circumferential wall (34) of the cover (36) with a small clearance.

2. A single-lever mixer as claimed in claim 1, characterised in that the cover (36) is connected to the adjusting shank bearing part (20) so as to be secured against rotation.

3. A single-lever mixer as claimed in claim 2, characterised in that the cover (36) is connected to the adjusting shank bearing part (20) via at least one key/slot connection (48, 50) extending parallel to the cartridge axis.

4. A single-lever mixer as set forth in claim 3 wherein the cover (36) consists of two cover parts (40, 42), the separation plane between these cover parts extending through the opening (32) in the circumferential wall (34) of the cover (36).

5. A single-lever mixer as set forth in claim 4 wherein the cover parts (40, 42) are held together by a snap connection (44, 46).

6. A single-lever mixer as set forth in claim 2 wherein the cover (36) consists of two cover parts (40, 42), the separation plane between these cover parts extending through the opening (32) in the circumferential wall (34) of the cover (36).

7. A single-lever mixer as set forth in claim 6 wherein the cover parts (40, 42) are held together by a snap connection (44, 46).

8. A single-lever mixer as set forth in claim 3 wherein a sliding seal (38) which is provided in the opening (32) in the circumferential wall (34) of the cover (36) and which co-operates with the outer surface of the circular-arc-shaped lever section (30).

9. A single-lever mixer as set forth in claim 2 wherein a sliding seal (38) which is provided in the opening (32) in the circumferential wall (34) of the cover (36) and which co-operates with the outer surface of the circular-arc-shaped lever section (30).

10. A single-lever mixer as claimed in claim 1 characterised in that the cover (36) consists of two cover parts (40, 42), the separation plane between these cover parts extending through the opening (32) in the circumferential wall (34) of the cover (36).

11. A single-lever mixer as claimed in claim 10, the opening in the circumferential wall of the cover being rectangular, viewed in a development, characterised in that the separation plane is adjacent to one of the rectangular edges extending in the circumferential direction.

12. A single-lever mixer as set forth in claim 11 wherein a sliding seal (38) which is provided in the opening (32) in the circumferential wall (34) of the cover (36) and which co-operates with the outer surface of the circular-arc-shaped lever section (30).

13. A single-lever mixer as claimed in claim 10, characterised in that the cover parts (40, 42) are held together by a snap connection (44, 46).

14. A single-lever mixer as set forth in claim 13 wherein a sliding seal (38) which is provided in the opening (32) in the circumferential wall (34) of the cover (36) and which co-operates with the outer surface of the circular-arc-shaped lever section (30).

15. A single-lever mixer as set forth in claim 10 wherein a sliding seal (38) which is provided in the opening (32) in the circumferential wall (34) of the cover (36) and which co-operates with the outer surface of the circular-arc-shaped lever section (30).

16. A single-lever mixer as claimed in claim 1, characterised by a sliding seal (38) which is provided in the opening (32) in the circumferential wall (34) of the cover (36) and which co-operates with the outer surface of the circular-arc-shaped lever section (30).

* * * * *